United States Patent [19]

Janzon et al.

[11] 3,929,907

[45] Dec. 30, 1975

[54] HALOGENATION OF PHENOLIC COMPOUNDS

[75] Inventors: Karl Heinz Janzon, Grossauheim; Wolfgang Weigert, Offenbach; Hilmar Hein, Wiesbaden-Kohlheck; Helmut Mechler, Hofheim; Eugen Meyer-Simon, Frankfurt, all of Germany

[73] Assignee: Deutsche Gold- und Silber-Scheideanstalt vormals Roessler, Germany

[22] Filed: June 1, 1973

[21] Appl. No.: 365,975

[30] Foreign Application Priority Data

June 6, 1972 Germany............................ 2227439

[52] U.S. Cl....... 260/619 R; 260/283 R; 260/283 S; 260/287 R; 260/288 R; 260/289 R; 260/290 HL; 260/294.8 F; 260/295 R; 260/296 R; 260/297 R; 260/315 R; 260/319.1; 260/326.12 R; 260/326.15; 260/326.16; 260/366.8; 260/326.82; 260/326.85; 260/329 R; 260/329 S; 260/329 AM; 260/521 S; 260/521 P; 260/332; 260/521 H; 260/521 B; 260/346.2 R; 260/571; 260/574; 260/505 R; 260/578; 260/590; 260/505 C; 260/599; 260/600; 260/507 R; 260/619 A; 260/620; 260/508; 260/622 R; 260/623 H; 260/509; 260/645; 260/649; 260/511; 260/512 R; 260/668; 260/512 C; 260/520; 260/521 N

[51] Int. Cl.$^2$.................. C07C 17/02; C07C 37/00
[58] Field of Search........ 260/619 A, 623 H, 619 R, 260/620, 521 A, 512 R, 512 C, 600, 571, 622 R, 520, 574

[56] References Cited
UNITED STATES PATENTS

| | | | |
|---|---|---|---|
| 1,912,744 | 6/1933 | Voh Bramer et al. | 260/623 H |
| 2,229,574 | 1/1941 | Jung | 260/621 H |
| 2,811,566 | 10/1957 | Bader | 260/623 |
| 3,029,291 | 4/1962 | Dietzler | 260/619 A |
| 3,234,291 | 2/1966 | Kelly | 260/623 H |
| 3,453,335 | 7/1969 | Starnes | 260/623 H |
| 3,546,302 | 12/1970 | Asadorian et al. | 260/623 H |

OTHER PUBLICATIONS

Marsh, *J. Org. Chem.*, Vol. 1927, p. 3164 (1927).
Freser et al., *Org. Chem.*, pp. 637–638, (1944).
Moller, *Chem. of Org. Comp.*, 3rd Edition, p. 554 (1965).
Weygand, *Prep. Org. Chem.*, 4th Edition, pp. 152, 155, 165, 166, 199, (1968).

*Primary Examiner*—Norman Morgenstern
*Attorney, Agent, or Firm*—Cushman, Darby & Cushman

[57] ABSTRACT

Aromatic and heterocyclic compounds are halogenated by a combination of chlorine, bromine or iodine and hydrogen peroxide, preferably in a two-phase system containing water and an organic liquid.

22 Claims, No Drawings

HALOGENATION OF PHENOLIC COMPOUNDS

The invention is concerned with the use of chlorine, bromine or iodine, i.e., halogens of atomic weight 35 to 127, as halogenation agents in the substituting halogenation of aromatic and heteroaromatic compounds, preferably phenols.

It is known to substitutingly halogenate aromatic compounds by the action of chlorine, bromine, or iodine. The halogens for these reactions are generally added as such in gas or liquid form or in a solvent. It is also known, however, to use hydrohalic acids or salts of such acids and to set free the halogens directly (in statu nascendi) from these by addition of an oxidizing agent. As such oxidizing agents there can be used among others the salts of the corresponding halic acids chlorates, bromates, iodates and hydrogen peroxide (Houben-Weyl, Vol. V, 3 pages 518 et seq., Vol. V 4 pages 15 and 579).

In the halogenation there are formed equivalent amounts of hydrogen halide as a byproduct, thus at best only half of the added halogen is used for the halogenation. The recovery of the hydrogen halide from the reaction mixture for reuse is cumbersome and not possible without considerable loss, the obtaining of the pure halogenated aromatic compounds requires expensive separating processes. To be sure it is more easily possible in the case of the bromination of phenols to obtain the pure halogen compounds by carrying out the reaction in the presence of two liquid phases (Asadorian U.S. Pat. No. 3,546,302); however, the recovery of the hydrogen bromide and its use for further bromination is cumbersome.

It is known in the case of bromination to directly oxidize to bromide the hydrogen bromide formed by the use of a mixture of about equivalent amounts of bromine and chlorine (Nentwig, German Pat. No. 1,151,811). However, this process has the disadvantage that because of the evolving of chlorinated compounds as byproducts the recovery of the pure bromine compounds is difficult.

It has now been found that it is advantageous to use as the halogenation agent in the substituting halogenation of aromatic and heteroaromatic (i.e., heterocyclic) compounds a mixture of chlorine, bromine or iodine with hydrogen peroxide.

By the addition of hydrogen peroxide the hydrogen halide formed is immediately reconverted into the halogen; a separation or recovery of the hydrogen halide consequently is eliminated. Since the hydrogen peroxide is converted into water, there are present no foreign substances in contrast to the known processes for the use of chlorine-bromine mixtures for bromination, see that the recovery of the organic halogen compounds produced can occur in a simple manner.

The halogenation according to the process of the invention can be applied to aromatic (carbocyclic) and heteroaromatic (heterocyclic) compounds, for example, aromatic and heteroaromatic hydrocarbons such as benzene, naphthalene, anthracene, furane, diphenyl, diphenyl alkanes, e.g., diphenyl methane, 2,2-diphenylpropane, pyrrole, thiophene, carbazole, indole, benzothiophene, coumarone, pyridine and quinoline and their alkyl, halogen, nitro, carbonyl sulfonic and especially amino and hydroxy derivatives, preferably phenols such as phenol, hydroquinone, hydroxybenzaldehyde, e.g., salicylaldehyde, salicylic acid, p-aminophenol, m-cresol, o-cresol, p-cresol, 1,2,4-xylenol, resorcinol, p-t-butylphenol, p-dodecylphenol, m-octylphenol, o-butyphenol, p-octadecylphenol, alpha naphthol and beta naphthol, anthranilic acid, benzoic acid, toluene, p-xylene, m-xylene, o-xylene, p-phenylphenol, alpha-methyl napthalene, decylbenzene, ethylbenzene, nitrobenzene, p-nitrophenol, o-nitrophenol, anthrahydroquinone, p-fluorophenol, p-chlorophenol, o-bromophenol, fluorobenzene, chlorobenzene, bromobenzene, iodobenzene, m-nitrotoluene, benzenesulfonic acid, p-toluenesulfonic acid, 2-methylthiophene, 3-methylthiophene, aniline, N,N-dimethylaniline, 2-methyl furane, N-methylpyrrole, 2-methylpyrrole, pyridine, o-toluidine, p-toluidine, alpha-picoline, beta-picoline, gamma-picoline, quinoline, lepidine, quinaldine. The process of the invention is especially suited for the halogenation, especially for bromination of diphenols such as alkylidene diphenols, especially 4,4$^1$-isopropylidene diphenol. Other suitable diphenols include 2,2$^1$-isopropylidene diphenol, 4,4$^1$-methylenebisphenol, 4,4$^1$-butylidene diphenol, 4,4$^1$-dihydroxydiphenyl.

The compounds can be reacted with chlorine, bromine or iodine according to the invention. The halogen can be used as such or as a solution in water or an organic solvent. The hydrogen peroxide is suitably added as an aqueous solution of 3 to 70 weight %, preferably of more than 25 weight %. It has proven favorable in many cases to add inert acids, especially sulfuric acid and customary halogenation catalyst such as aluminum, iron, zinc and antimony halides such as aluminum chloride, aluminum bromide, aluminum iodide, ferric chloride, ferric bromide, ferric iodide, zinc chloride, zinc bromide, antimony (III) chloride, antimony (III) bromide and antimony (V) chloride, and iodine.

It is generally advantageous to carry out the reaction in a two-phase system which consists of water and an organic phase. If necessary organic solvents can be added. As such there can be used benzene, toluene, o-xylene, m-xylene, p-xylene, alkanes, e.g., n-pentane, n-hexane, n-octane, n-decane, gasoline, petroleum ether, halohydrocarbons, e.g., chlorobenzene, carbon tetrachloride, ethylene dibromide, ethylene dichloride, chloroform, fluorobenzene, 1,1,2-trichloroethane, 1,1,1-trichloroethane, propylene dichloride, dibromotetrafluoroethane, trichlorotrifluoroethane, propylbromide, tetrachlorodifluoroethane, butyl chloride, amyl chloride, hexyl chloride, alcohols such as methanol, ethanol, isopropanol, propanol, butanol, n-hexanol, 2-ethylhexanol, isooctyl alcohol, ether alcohols and ethers such as ethylene glycol monomethyl ether, ethyleneglycol monoethyl ether, ethylene glycol diethyl ether, ethylene glycol dimethyl ether, dioxane, dioxolane, etc.

The choice of solvent, the sequence of addition of substances, the molar proportions and the reaction conditions and pressure can be varied widely depending on the type of substances.

In many cases it is advantageous to have the compound to be halogenated present, in a given case in a solvent and to gradually add halogen and hydrogen peroxide, namely at first at least partially the halogen.

The halogens are used in the stoichiometrically necessary amount required for the substitution, or in slight excess, seldom more than 10%. Theoretically, the amount of hydrogen peroxide is required in an equimolar amount to the halogen. In most cases it is recommended to add the hydrogen peroxide in excess up to about 50%. In many cases, however, a larger excess can be used or there can even be used less than an equivalent amount.

The reaction is suitably carried out at a temperature between about 0° and 100° C. In many cases it is necessary in the beginning, this means especially during the addition of the halogen and hydrogen peroxide, to hold the temperature to less than about 40° C., if necessary by cooling, and only later in the course of the reaction to allow this value to be exceeded. Although the reaction takes place at normal pressure, on account of the volatility of some of the substances it can on occasion be advantageous to use corresponding excess pressure to retain them in the liquid phase.

The process of the invention is especially suited for the bromination of diphenols, especially 4,4¹-isopropylidene diphenol (Bisphenol A). Surprisingly, in this reaction using less than stoichiometric amounts of hydrogen peroxide there is produced a complete reaction.

A preferred method of operation for the bromination of diphenols is a two phase of water and benzene, 2-ethyl hexanol and/or a mixture of aliphatic hydrocarbons boiling between 80° and 200° C, especially between 100° and 140° C. Advantageously for each part by volume of water there is employed 1 to 5 parts by volume of organic solvent. As the solvent there is especially suited a mixture of about 1 to 9 parts by volume of 2-ethyl hexanol with 10 parts by volume of the aliphatic hydrocarbon mixture. For each substitution there is preferably used 0.50 to 0.55 mole of bromine and 0.35 to 0.50 mole, especially 0.40 to 0.45 mole of hydrogen peroxide. Larger amounts of bromine and hydrogen peroxide it should be understood can be used, but, however, are superfluous.

The halogenated aromatic and heteroaromatic compounds have many uses. For example chlorinated benzene and toluene and 2,4-dibromoanthraquinone are useful in the synthesis of dyestuffs, dibromosalicylaldehyde, 3,4,5-tribromosalicylanilide and 3,5-dibromosalicylic acid as pharmaceuticals, 2,6-diiodophenol sulfonic acid as a disinfectant, tribromophenol as a fungicide and hexabromodiphenyl and octabromodiphenyl are added as flame protective agents. The brominated diphenols are especially valuable as flame protective or fire proofing agents.

Unless otherwise indicated all parts and percentages are by weight.

EXAMPLE 1

To a mixture of 870 ml of concentrated sulfuric acid, 4 grams of iodine and 53 grams of o-xylene were added dropwise in the course of 3 hours with 57 ml of bromine and 30 ml of 70% aqueous hydrogen peroxide. The temperature was held at 35° C. The mixture was treated with an additional 10 ml of hydrogen peroxide in the course of an hour, heated to 100° C and held at this temperature for 3 hours. Upon cooling of the reaction mixture, the tetrabromo-o-xylene formed crystallized out. It was separated, washed with water and dried at 70° C, the bromine content of the compound was 73.6%, the melting point 260° to 261° C. The yield amounted to 160 grams, corresponding to 75% based on the o-xylene added.

EXAMPLE 2

17.8 grams of chlorine were led into a mixture of 34.5 grams of salicylic acid and 200 ml of acetic acid and simultaneously there were dropped in 30 ml of 70% aqueous hydrogen peroxide. The temperature was held at 20° C. The feeding of the chlorine was completed after 60 minutes and of the hydrogen peroxide after 75 minutes. The mixture was then held for 30 minutes at 60° C, subsequently cooled to 20° C and poured into 2 liters of cold water. The 3,5-dichlorosalicylic acid which separated was filtered off, washed with water and dried. It had a melting point of 221° C. and a chlorine content of 43.5%. The yield was 81% based on the salicylic acid added.

EXAMPLE 3

A mixture of 69 grams of salicylic acid, 400 ml. of benzene and 100 ml. of water were treated with 28 ml. of bromine in the course of 60 minutes while the temperature increased from 20° to 40° C. When a temperature of 30° C. was reached the feeding in of 18 ml. of 70% aqueous hydrogen peroxide was begun and the addition continued in the course of 100 minutes at a temperature increasing up to 50° C. The mixture was then held for 30 minutes at 70° C. There were recovered 118 grams of 3,5-dibromosalicylic acid, corresponding to a yield of 79%, which had a melting point of 224° to 226° C. and a bromine content of 53.5%. In further experiments with repeated use of the mother liquor there were always recovered 127 grams of the dibromosalicylic acid, corresponding to a yield of 86%.

EXAMPLE 4

69 grams of salicylic acid were dissolved in 400 ml. of 2-ethyl hexanol. To the solution there were added 100 ml. of water and 127 grams of iodine. With slow warming of the mixture, there were added in the course of 30 minutes 38 ml. of 70% hydrogen peroxide and after 30 minutes interruption a further 10 ml. of hydrogen peroxide were added.* Then the mixture was cooled to 15° C. The 3,5-diiodosalicylic acid which precipitated out was separated off and washed with water and petroleum ether. The organic phase of the mother liquor was used for further experiments. From a total of 5 such experiments there was obtained a yield of 833 grams corresponding to a yield of 85% based on the salicylic acid. The diiodosalicylic acid had a melting point of 232° C. and an iodine content of 63%.

*Finally the temperature was 95° C; it was maintained for 30 minutes.

EXAMPLE 5

To a mixture of 60 grams of 4-hydroxybenzaldehyde, 400 ml. of benzene and 80 ml. of water there were added in the course of 30 minutes 27 ml of bromine and subsequently in the course of 30 minutes 70 ml. of 70% aqueous hydrogen peroxide. The temperature, meanwhile, was 25° C. Then the mixture was held for 30 minutes at 70° C. and subsequently cooled. The precipitated 3,5-dibromo-4-hydroxybenzaldehyde was filtered off, washed with water and dried at 60° C. under reduced pressure. It had a melting point of 181° to 182° C. and a bromine content of 56.1 %. The yield was 122 grams, corresponding to 88% based on the hydroxybenzaldehyde added.

EXAMPLE 6

To a mixture of 47 grams of phenol, 500 ml. of benzene and 100 ml. of water there were added in the course of 30 minutes at about 20° C. 41 ml. of bromine and subsequently in the course of 60 minutes while the temperature increased to 70° C. 40 ml. of 70% aqueous hydrogen peroxide. The mixture was held at 70° C. for 30 minutes. There were recovered 143 grams of 2,4,6-tribromophenol, corresponding to a yield of 86% based on the phenol added. The tribromophenol had a melting point of 89° C. and a bromine content of 68.7%.

EXAMPLE 7

To a mixture of 114 grams of 4,4¹-isopropylidenediphenol, 500 ml. of benzene and 100 ml. of water there were added in the course of 30 minutes at temperatures between 5 and 15° C. 55 ml. of bromine and subsequently 40 ml. of 70% aqueous hydrogen peroxide in the course of 40 minutes with increase of the temperature to 40° C. The mixture was then held for 60 minutes at 70° C. The product precipitated out upon subsequent cooling, was filtered off and washed with water. There were recovered 232 grams of 4,4¹-isopropylidene bis(2,6-dibromophenol), corresponding to a yield of 85% based on the diphenol employed. The product had a melting point of 179° to 181° C. and a bromine content of 58.3%. In further repetitions of the experiment but using the mother liquor the average yield was 254 grams, corresponding to 93%.

EXAMPLE 8

To a mixture of 114 grams of 4,4¹-isopropylidene diphenol, 400 ml. of 2-ethyl hexanol and 100 ml of water there was added at 20° C. in the course of 30 minutes 53 ml. of bromine and subsequently in the course of 20 minutes with an increase in the temperature to 35° C. of 40 ml. of 70% aqueous hydrogen peroxide. The mixture was then held at 80° C, for 30 minutes. There was recovered 205 grams of 4,4¹-isopropylidene-bis(2,6-dibromophenol), corresponding to a yield of 76% based on the starting diphenol added. The product had a melting point of 181° to 182° C. and a bromine content of 58.1%. Upon repeatedly reusing the mother liquor in the subsequent repetitions of the procedure, the yield averaged 258 grams, corresponding to 95%.

EXAMPLE 9

There was dissolved in a mixture of 28 liters of gasoline (boiling range 100° to 140° C.) and 12 liters of 2-ethyl hexanol 11.4 kilograms of 4,4¹-isopropylidene diphenol. This solution was first treated with 10 liters of 5% aqueous sulfuric acid, then in the course of 60 minutes with 5.1 liters of bromine and in the course of a further 150 minutes with 3.1 liters of 70% aqueous hydrogen peroxide. The temperature was held below 30° C. during the treatment. Then the mixture was heated to 80° C. and then cooled to room temperature. The precipitated 4,4¹-isopropylidene-bis(2,6-dibromophenol) was separated, washed with 15 liters of gasoline and then washed with 30 liters of water and subsequently dried at temperature up to 60° C. The yield amounted to 21.8 kilograms, corresponding to 80% based on the starting diphenol. Upon repeatedly reusing the organic phase in the subsequent repetitions of the procedure yields of 95% were produced. The product had a melting point between 176° and 180° C. and a bromine content of 58.5%.

What is claimed is:

1. In a process of halogenating a phenol selected from the group consisting of (1) a phenol having 1 to 2 phenolic hydroxyl groups as the sole substituents, (2) benzene having one hydroxyl substituent and one aldehydo, carboxylic acid or sulfonic acid substituent as the sole substituents, (3) p-aminophenol, (4) p-nitrophenol, (5) o-nitrophenol, (6) p-fluorophenol, (7) p-chlorophenol and (8) o-bromophenol with chlorine or bromine in the liquid phase the improvement comprising carrying out said halogenation in the presence of aqueous hydrogen peroxide at a temperature of 0° to 100°C. and recovering the halogenated phenol formed.

2. A process according to claim 1, wherein the compound has 1 to 2 phenolic hydroxyl groups as the sole substituents.

3. A process according to claim 1 wherein the phenol is a phenol having 2 phenolic hydroxyl groups as the sole substituents.

4. A process according to claim 3 wherein the phenol is an alkylidene diphenol.

5. A process according to claim 2, wherein the compounds is 4,4¹-isopropylidene diphenol.

6. A process according to claim 5, wherein the halogen is bromine.

7. A process according to claim 6, wherein the bromine is used in an amount of 0.50 to 0.55 moles and the hydrogen peroxide in an amount of 0.40 to 0.45 moles per mole of the diphenol and the product is 4,4¹-isopropylidene bis (2,6-dibromo-phenol).

8. A process according to claim 1, wherein the phenol is benzene having one hydroxyl substituent and one aldehydo, carboxylic acid or sulfonic acid substituent.

9. A process according to claim 8, wherein the halogen is bromine.

10. A process according to claim 1, wherein the process is carried out in a two phase system of:
    1. water, and
    2. a water immiscible organic liquid.

11. A process according to claim 1 wherein the halogen is bromine.

12. A process according to claim 1 wherein the phenol is selected from the group consisting of phenol per se, hydroquinone, salicylaldehyde, salicylic acid, p-aminophenol, m-cresol, o-cresol, p-cresol, 1,2,4-xylenol, resorcinol, p-t-butylphenol, p-dodecylphenol, m-octylphenol- o-butylphenol, p-octadecylphenol, alpha naphthol, beta naphthol, p-phenylphenol, p-nitrophenol, o-nitrophenol, anthrahydroquinone, p-fluorophenol, p-chlorophenol, o-bromophenol, 4,4'-isopropylidene diphenol, 2,2'-isopropylidene diphenol, 4,4'-methylenebisphenol, 4,4'-butylidene diphenol, and 4,4'-dihydroxydiphenyl.

13. A process according to claim 1, wherein the proportions of halogen to hydrogen peroxide range from an excess of 10% of halogen to an excess of 50% of hydrogen peroxide.

14. A process according to claim 5 wherein the halogen is chlorine.

15. A process according to claim 8 wherein the halogen is chlorine.

16. A process according to claim 1 wherein the halogen is chlorine.

17. A process according to claim 12 wherein the halogen is bromine.

18. A process according to claim 13 wherein the halogen is bromine.

19. A process according to claim 10 wherein the halogen is bromine.

20. A process according to claim 19 wherein the phenol is 4,4'-isopropylidene diphenol.

21. A process according to claim 12 wherein the process is carried out in a two phase system of:
    1. water, and 2. a water immiscible organic liquid.

22. A process according to claim 10 wherein there is employed 1 to 5 parts by volume or organic solvent per part by volume of water.

* * * * *

UNITED STATES PATENT OFFICE
CERTIFICATE OF CORRECTION

PATENT NO. : 3,929,907
DATED : December 30, 1975
INVENTOR(S) : Karl Heinz JANZON et al.

It is certified that error appears in the above-identified patent and that said Letters Patent are hereby corrected as shown below:

Claim 7, line 4 (column 6), change "mole" to --substitution--.

Signed and Sealed this

Twenty-first Day of September 1976

[SEAL]

Attest:

RUTH C. MASON
*Attesting Officer*

C. MARSHALL DANN
*Commissioner of Patents and Trademarks*